United States Patent Office 3,445,167
Patented May 20, 1969

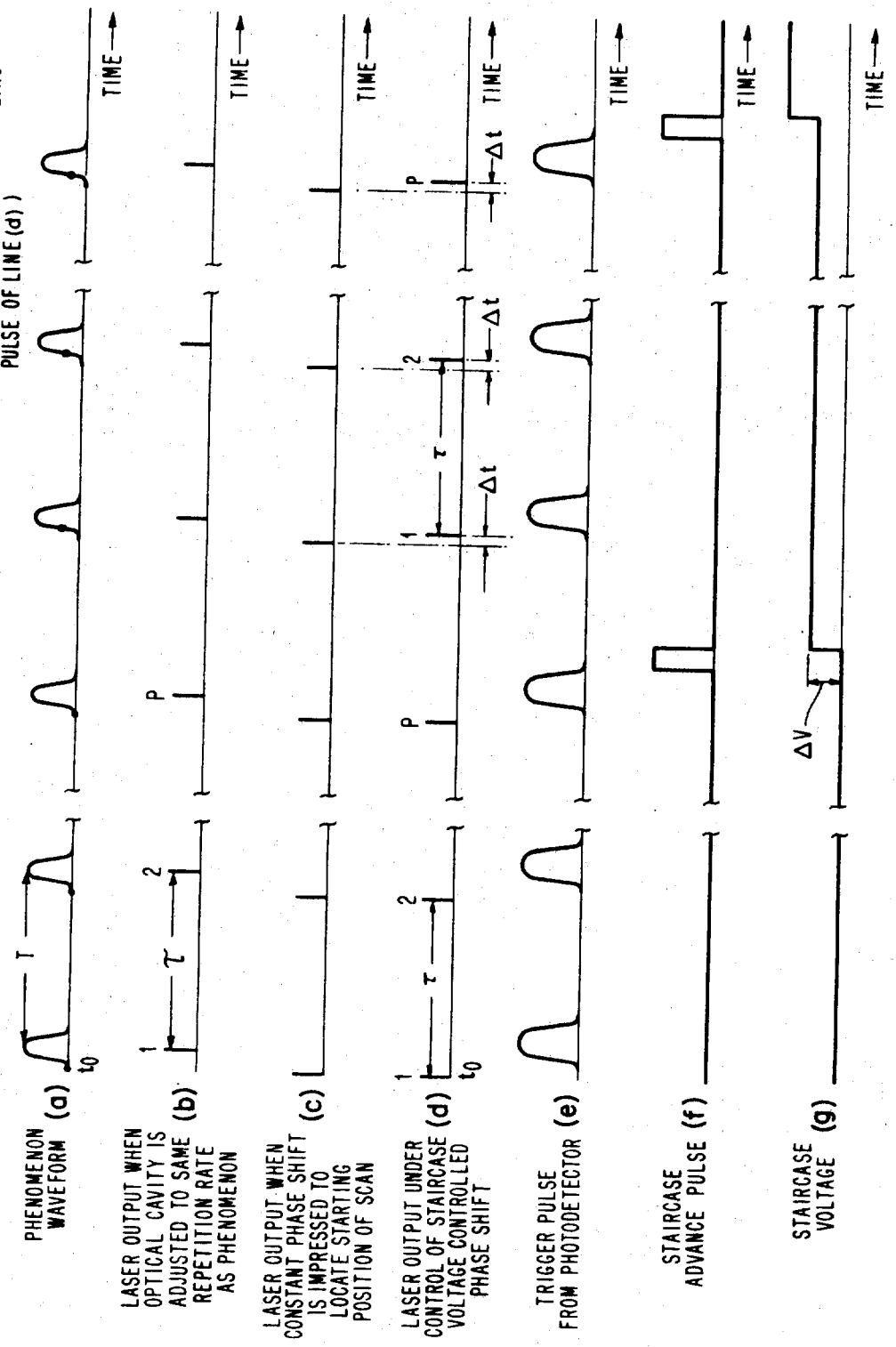

3,445,167
OPTICAL SAMPLING SCOPE-STROBOSCOPE USING A PULSED LASER
John A. Armstrong, South Salem, and Norman Braslau, Katonah, N.Y., assignors to International Business Machines Corporation, Armonk, N.Y., a corporation of New York
Filed Jan. 13, 1967, Ser. No. 609,184
Int. Cl. G01p *3/40*
U.S. Cl. 356—23     3 Claims

ABSTRACT OF THE DISCLOSURE

This invention is an optical analogue of a sampling oscilloscope which allows one to display with higher time resolutions than hitherto obtainable a repetitive phenomenon that reacts with light. In the main, the system relied upon to obtain such high time resolutions comprises a generator of a train of very short (of the order of $10^{-11}$ seconds) optical pulses of accurately controllable repetition frequency, a means for shifting the occurrence of said pulses with respect to a given time reference, including means for passing these optical pulses through or reflecting them from a repetitive phenomenon capable of examination optically, and means for converting the signals obtained by such optical examination to electrical signals that can be displayed.

BACKGROUND OF THE INVENTION

The invention to be shown and described hereinafter provides a system for measuring fast rise-time repetitive optical signals in a way similar to that of a sampling oscilloscope, the latter measuring fast rise-time repetitive voltage waveforms. In the sampling techniques, a signal is sensed during a short interval on each sequential occurrence of a repetitive waveform; successive samples are taken at increasingly greater time intervals with respect to a reference time in each interval. A pictorial representation of the waveform results wherein a voltage proportional to the sensed signal at a particular sampling time is displayed, for example, as the ordinate at a position on the abscissa proportional to the sampling time position with respect to the reference time.

The techniques to be described hereinbelow employ some of the techniques and circuits of conventional electronic sampling scopes such as a sampling capacitor and means for measuring and displaying voltages across such capacitor. Typical of such known oscilloscopes would be that shown and described in the Sugarman Patent No. 2,951,181 or the Tektronix Type 661 manufactured and sold by Tektronix Inc., of Beaverton, Oreg. However, our techniques differ from those shown and described in aforementioned conventional oscilloscopes in that there is no need for an electronic sampling gate circuit ahead of the sampling capacitor. Our system provides ultra short pulses of light which are used to sample a very short portion in time of the optical phenomena under study and, by means of a photodetector responsive to the light transmitted to or reflected from the sampled phenomenon, provides an electrical signal proportional to such light detected. The electrical signal so obtained is fed through a low pass electrical filter to a sampling capacitor and then to the display circuitry of a conventional sampling oscilloscope. Thus, the function of the gate employed in conventional sampling oscilloscopes is here provided by the extremely short duration of the repetitive light pulses that illuminate the phenomenon under study.

Optical stroboscopic techniques have been widely used for the observation of repetitive phenomena, such as the "stopping" of a rotating fan blade. This invention constitutes an extension of this concept wherein the information desired is contained as an amplitude or intensity modulation of a train of light pulses in time, so arranged as to enable the information to be recovered by conventional electronic sampling techniques. The advantages of this invention over the present art are the high time resolutions available by the use of laser techniques to be described below, and the ability to control this time interval between successive pulses of light emitted from said laser so as to be able to sweep over the waveform of interest in a manner compatible with electronic sampling methods.

Consequently, it is an object of this invention to obtain an optical sampling oscilloscope.

Yet another object is to provide an optical sampling oscilloscope for studying phenomena capable of being represented by waveforms having rise times of the order of $10^{-11}$ seconds.

Still another object is to employ the unique characteristics of a mode-locked laser as the generator of a train of very short pulses needed to perform the sampling function of an optical sampling oscilloscope.

A further object is to provide a means for varying the time origin of the said train of short pulses by varying the phase of the oscillating signal which mode locks the laser.

The foregoing and other objects, features and advantages of the invention will be apparent from the following more particular description of preferred embodiments of the invention, as illustrated in the accompanying drawings.

BRIEF DESCRIPTION OF THE DRAWINGS

FIGS. 2a–2g are various functions of time diagrams for aiding in the understanding of the operation of the invention set out in FIG. 1.

SUMMARY OF THE INVENTION

Figure 1:
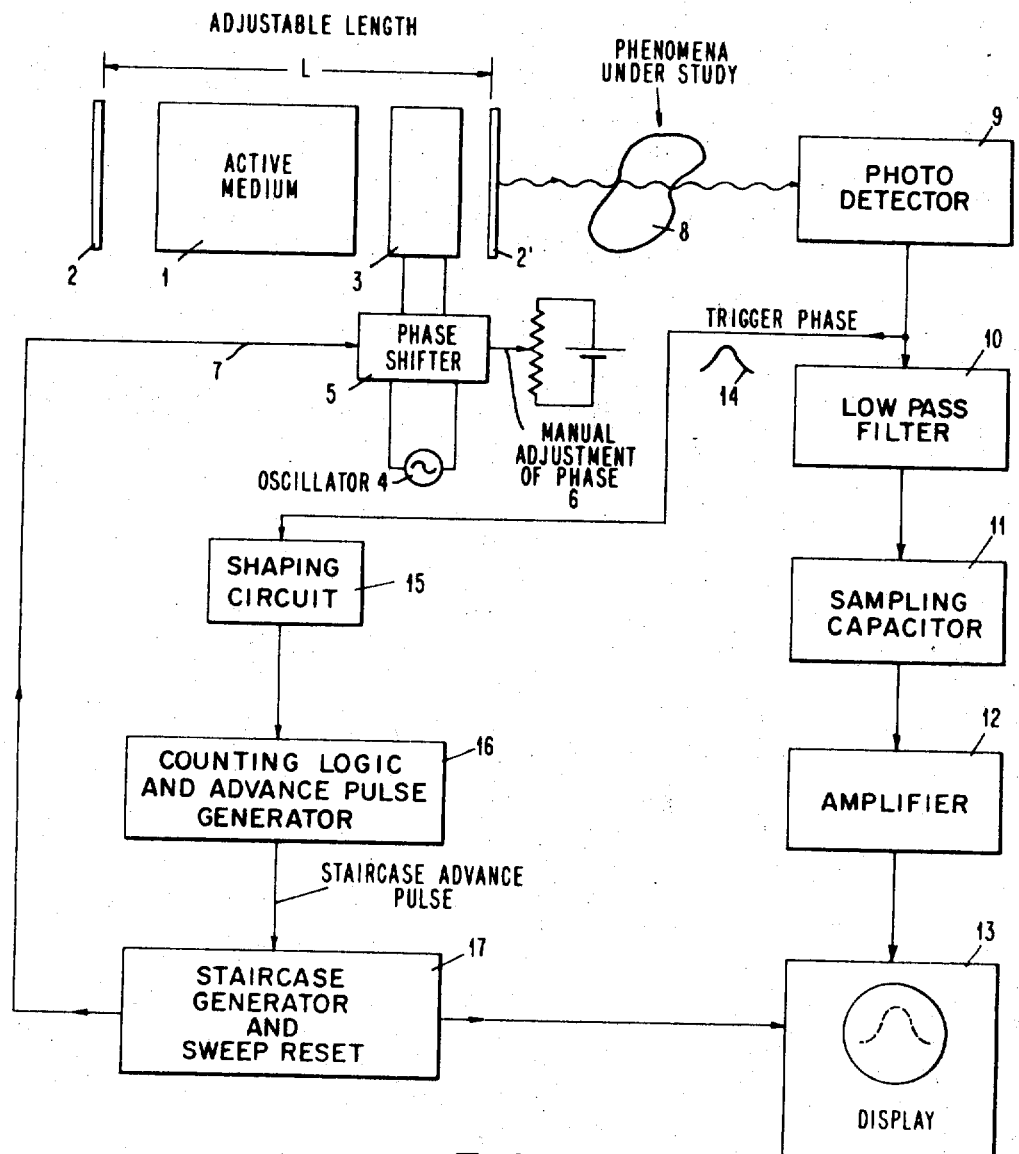
FIG. 1 is a schematic diagram illustrating a principal embodiment of the invention.

The optical sampling oscilloscope in FIG. 1 employs a laser formed by an active medium 1 and an optical cavity formed by the partially transparent mirrors 2 and 2'. A voltage controlled optical loss mechanism 3 is described in detail in an article entitled "Generation of Ultrashort Optical Pulses by Mode Locking the YA1G:Nd Laser" by M. DiDomenico et al. on pp. 180–183 of the Apr. 1, 1966 issue of the "Applied Physics Letters," vol. 8, No. 7, such mechanism causing a mode locking of the axial modes of the laser when the loss mechanism 3 is modulated by an oscillator 4 at a frequency corresponding to the axial mode separation of the laser.

Such mode locking causes the laser to emit a train of short duration pulses of light separated by a time interval equal to the reciprocal of the axial mode separation frequency. The position of a laser pulse with respect to a reference time in the repetition interval can be varied by changing the phase of the signal from the driving oscillator 4 by means of a voltage controlled phase shifter 5. Such phase shifters are well known in the electrical art; for example, a suitable one that can be employed in the practice of this invention is shown and described in "Electronic and Radio Engineering" by F. E. Terman, published by McGraw-Hill, 1955, page 604.

The emitted laser beam is transmitted through, reflected from, or otherwise modulated by the phenomenon 8 under study, such phenomenon 8 impressing a time-varying change in the amplitude or intensity of the emitted pulse train. The thus modulated beam is then incident on a photodetector 9. The output electrical signal from detector 9 may not be able to faithfully reproduce the fast incident optical pulses because of rise time limitations of the detector, but this is not critical so long as the total number of photoelectrons emitted by the cathode of the photodetector 9 is proportional to the optical energy received at the photodetector during the laser beam pulse.

The output from the photodetector 9 is passed through a low pass filter 10 to a sampling capacitor 11 and causes a voltage to be impressed across it that is proportional to the integrated intensity of the received optical pulses. Amplifier 12 transmits amplified outputs of sampling capacitor 11 to display circuitry 13 that could be part of any commercially available electronic sampling oscilloscope, such as the Tektronix Type 661, manufactured by Tektronix, Inc., Beaverton, Oreg.

The necessary timing for operation of the optical sampling oscilloscope is achieved by sampling the photodetector output to obtain a trigger pulse 14 which is suitably shaped by a shaping circuit 15 to drive a counting circuit 16. The output of the latter circuit 16 is a staircase advance pulse which causes an incremental increase in the output voltage of the staircase generator 17 after a predetermined number of input pulses are received. Such incremented output voltage is used to deflect the display shown on the screen of display unit 13 along an axis by an amount proportional to the time interval of that pulse with respect to a reference time in the repetitive interval; the incremented output voltage is also used to change the phase of the oscillator 4 by incrementally increasing the phase shift with the voltage controlled phase modulator 5 through suitable circuitry 7. The staircase generator 17 also incorporates sweep reset circuitry, conventional in the display art, so as to suitably retrace the display as required. The phase shifter 5 can be manually adjusted to facilitate initial operating conditions of the optical sampling oscilloscope.

Reference will now be had to FIGS. 2a–2g as an aid in understanding the sequence of operations of the novel optical sampling oscilloscope shown in FIG. 1. All curves are shown on the same time base. A repetitive phenomenon to be sensed having a repetition interval T is shown in FIG. 2a. The laser beam output of FIG. 2b has a repetition interval $\tau$ that is equal to the interval T. Such equality is obtained by separating the mirrors 2 and 2' (FIG. 1) and adjusting the frequency of oscillator 4 to the frequency corresponding to the reciprocal of the time interval $\tau$. A constant phase shift can be impressed upon loss modulator 3 to shift the position of the time of occurrence of the pulse (for the initial value zero, for example, of a staircase signal) to a suitable point with respect to the phenomenon under study. FIG. 2c indicates such initial suitable point in time with respect to laser outputs and phenomenon waveform. Once the staircase generator 17 is switched into the circuitry of FIG. 1, the sequence of operations shown in FIGS. 2d, 2e, 2f and 2g occurs.

The optical sampling of phenomenon 8 begins when the laser pulse 1 at time $t_0$ (FIG. 2d) yields a trigger pulse (FIG. 2e) causing an advance pulse (FIG. 2f) to be generated after the required number P of samples have been obtained, causing the staircase voltage to increase by an amount $\Delta V$. Such increase in voltage causes a shift in phase $\Delta \phi$ of the phase modulator 5, causing the laser pulse exiting from mirror 2' to be delayed an additional amount $\Delta t$ with respect to the reference time. Thus the next group of P pulses occurs at the same repetition rate as the phenomenon waveform but overlap at a slightly different relative position. Again the advance pulse (FIG. 2f) produced by the counting circuit and advance pulse generator circuit 16 causes the staircase voltage to increase by an amount $\Delta V$ after the required number P of trigger pulses have been counted, and the next group of pulses is delayed by a time $\Delta t$ from the previous group, or $2\Delta t$ from the first group. Thus each successive group of P pulses is affected by the phenomenon (waveform of FIG. 2a) taking place at a time interval $\Delta t$ from the previous one with respect to some reference point $t_0$ on the repetitive waveform.

It is understood that the phase of the oscillator 4 and, consequently, the shift in time $\Delta t$ cannot take place instantaneously. It will require a few pulses for an equilibrium time position to be reached. If the number, P, of pulses sampled is large, say $10^3$, a very small error in the integrated voltage on the sampling capacitor 11 of the oscilloscope will occur due to the photocurrent generated when such P number of pulses impinge on detector 9. If such error becomes unacceptable for the phenomenon being studied, a suitable gate ahead of the sampling capacitor 11 or a shutter between mirror 2' and the phenomenon 8 under study can be employed to block off or render these first several pulses ineffective. Such blocking gate, however, must have a rise time that is less than $\tau$, the interval between laser pulses.

The laser output (FIG. 2d), after the phenomenon 8 under study has been sampled, is detected and the resulting photocurrent produced in photodetector 9 charges the sampling capacitor 11. A deflection proportional to the capacitor voltage is displayed as a dot on the cathode ray tube of display 13, but displaced an amount proportional to the time position of that pulse. In effect, the waveform of FIG. 2a is recreated as a series of dots on the display that are stretched out in time.

The spirit and scope of this invention encompass those practices of the invention where it is inconvenient to adjust the laser pulse repetition rate to equal that of the waveform representative of the phenomenon under study. The laser pulse repetition rate $\tau$ is adjusted to a multiple or submultiple of that period T of the waveform of interest. If $$T = \frac{\tau}{n}$$

where $n$ is an integer, the system shown and described in FIG. 1 ignores those $(n-1)$ repetitions between intervals $\tau$. If $T = m\tau$, where $m$ is an integer, a shutter, such as a Kerr cell placed between crossed polarizers and inserted between mirror 2' and phenomenon 8 under study, can be provided to block the laser beam, or a relatively slow electronic gate can be provided to disable the photodetector 9 or block the charging of capacitor 11 during interval T, thus wasting the $(m-1)$ pulses occurring during this period. The staircase voltage increment $\Delta V$ would have to be reduced by a factor $\Delta V/m$ to give the same resolution as the waveform (FIG. 2a) and the scan of that waveform would take $m$ times longer. In order for the invention to operate in this changed manner, the shutter or gate must be capable of being turned on or off in a time $\tau$, a capability well within the present state of the art.

What has been shown and described hereinabove is an optical sampling oscilloscope that can "freeze" or "stop" a phenomenon capable of interacting with light at intervals as short as $10^{-11}$ seconds and obtain an electrical display of such optical interaction. The availability of a mode locked laser permits one to generate controllable pulses of the order of $10^{-11}$ seconds or less and this same mode locked laser is capable of having its cavity loss rate modulated by a phase-shifting technique, resulting in a linear shift of such controllable pulses to attain high speed sampling during extremely short intervals.

While the invention has been particularly shown and described with reference to preferred embodiments thereof, it will be understood by those skilled in the art that various changes in form and details may be made therein without departing from the spirit and scope of the invention.

What is claimed is:

1. A means for applying high speed optical pulses to a phenomenon under study comprising a laser having a plurality of axial modes, means for modulating the internal loss of such laser, an oscillator for applying an electrical signal to said loss modulating means at a frequency equal to the separation between adjacent axial modes so as to generate a train of equally spaced and very short duration light pulses, and means for shifting the phase of said electrical signal applied to said modulating means so as to shift the time origin of such generated train of light pulses.

2. A high speed optical sampling device comprising a mode locked laser capable of emitting a train of equally spaced very short duration light pulses, a repetitive phenomenon positioned for interaction with said light pulses, means for changing the time origin of said pulses, means for scanning said repetitive phenomenon with said light pulses by changing the time origin of successive groups of pulses with respect to a reference time position of said phenomenon so as to alter the amplitude or intensity of said group of pulses, and means responsive to such alterations to produce electrical signals indicative of the interaction of the phenomenon with light so as to electrically represent such interaction on a stretched out time scale.

3. A high speed optical sampling scope device comprising a mode locked laser having an optical cavity and capable of emitting a train of light pulses wherein the individual duration of each pulse is of the order of $5 \times 10^{-11}$ seconds or less and the separation between pulses is of the order of $3 \times 10^{-9}$ seconds or less, such mode locking having been achieved by modulating the cavity loss at an intermode frequency of said laser, means for modulating the phase of the loss modulation so as to shift the time origin of such generated train of light pulses, an oscilloscope display for providing a horizontal deflection proportional to the time for a given horizontal sweep of said oscilloscope, a high speed repetitive phenomenon positioned for optical examination by successive groups of such shifted laser beam pulses during said given horizontal sweep so as to obtain optical signals of the sampled phenomenon, and means for converting said optical signals into electrical signals proportional to said optical signals, such electrical signals being displayed on said oscilloscope during said horizontal sweep.

References Cited

UNITED STATES PATENTS 3,168,611   2/1965   Strauss.
3,335,285   8/1967   Gally et al.
3,351,761   11/1967   Hamby et al.

OTHER REFERENCES

Jones, "Methods of Modulating Light . . .," J. Sci. Instrum., v. 41, November 1964, pp. 653–661.

DiDomenico, Jr. et al., "Locking of He-Ne Laser Modes . . .," Applied Physics Letters, v. 6, L. 8, April 1965, pp. 150–152.

RONALD L. WIBERT, *Primary Examiner.*

W. A. SKLAR, *Assistant Examiner.*

U.S. Cl. X.R.

250—199; 331—94.5; 332—7.51; 356—201, 211